Figures 1, 2:
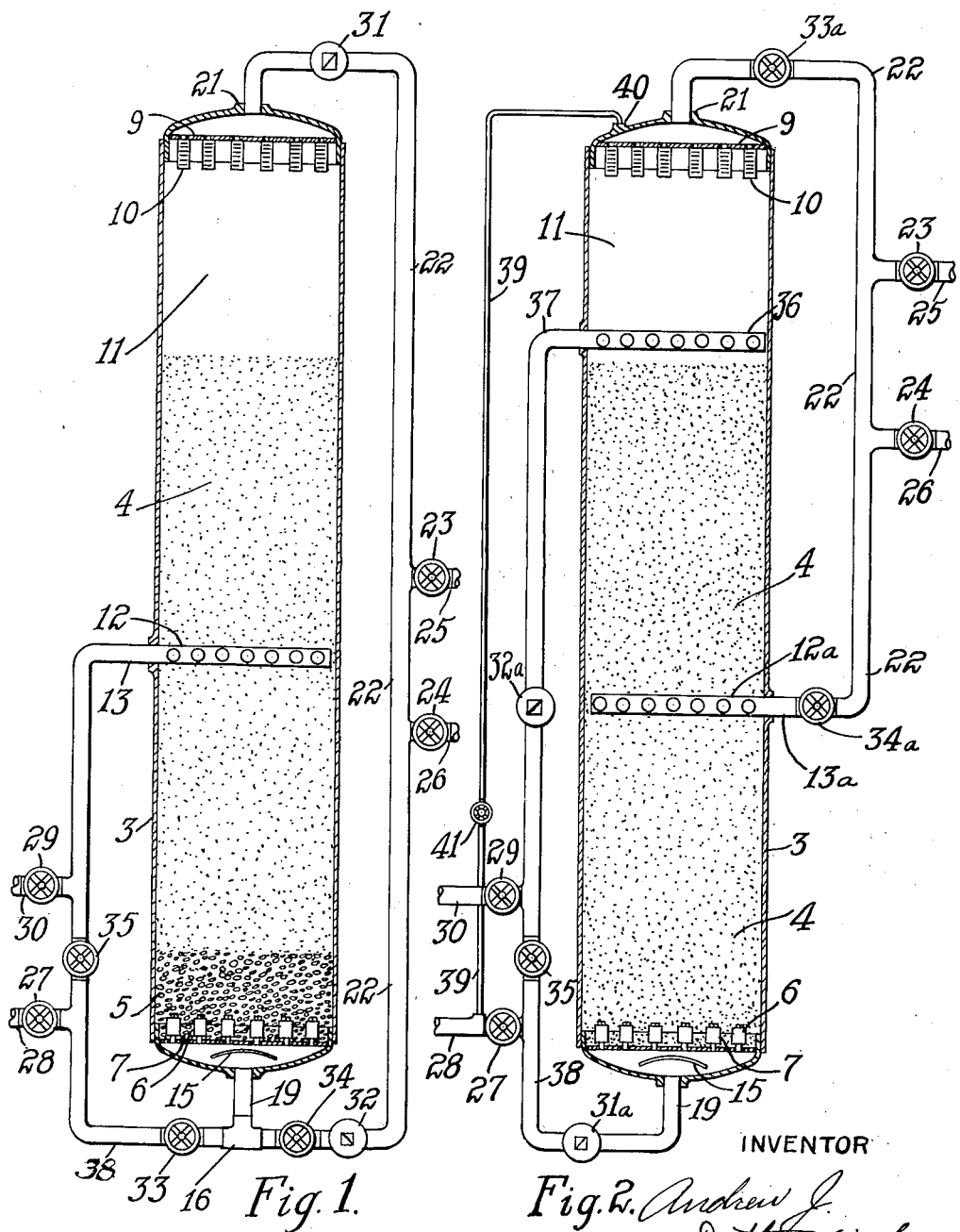

Jan. 9, 1934.  A. J. DOTTERWEICH  1,942,807
WATER SOFTENING APPARATUS
Filed Oct. 1, 1929

INVENTOR
Andrew J. Dotterweich

Patented Jan. 9, 1934

1,942,807

UNITED STATES PATENT OFFICE 1,942,807

WATER SOFTENING APPARATUS

Andrew J. Dotterweich, Pittsburgh, Pa., assignor to Automatic Water Softener Company, Pittsburgh, Pa., a corporation of Delaware Application October 1, 1929. Serial No. 396,504

10 Claims. (Cl. 210—24)

This invention relates to a complete improved water softening apparatus of the type employing a zeolite or base exchange material as a means to soften water and which is adapted to be regenerated at intervals.

It is among the objects of this invention to provide means for effecting greater efficiency of the softening material by directing the flow of fluids in divided paths thru the zeolite bed.

Another object of this invention is to provide means which permit the rate of flow of a fluid passing from the softener to exceed the maximum rate of flow of the fluid permissible through the zeolite bed of a conventional water softener having a bed of equal cross-sectional area.

Another object of this invention is to provide an apparatus which will permit regeneration to be quickly and efficiently effected.

These and other objects of the invention will become more apparent from consideration of the accompanying drawing in which like characters designate like parts and in which Fig. 1 is a sectional view of a water softening system embodying the principles of this invention and Fig. 2 is a modification thereof.

Referring to Fig. 1, this construction provides for an apparatus in which the fluid within the container flows from a central inlet point towards both ends of the container while in the modified drawing Fig. 2, the flows of the fluids is from both ends of the container towards the central or outlet point.

For purpose of an understanding of the principles involved in this invention, in practice, I have found that the depth of the zeolite bed affects the operations of regeneration and flushout in a manner whereby a deep zeolite bed requires a much longer time and more water for the complete regeneration per cubic foot thereof than is required by a shallow depth of zeolite bed per cubic foot.

Further, the rate at which a fluid passes thru the zeolite also affects the efficiency of operation in a manner that if water passes thru the zeolite at too high a rate of flow, the zeolite will not soften water completely during the softening period; likewise, if a regenerating solution is passed thru the zeolite bed at too high a rate of flow, regeneration will be inefficient resulting in a wastage of regenerating fluid and similarly, if the flushout water is passed thru the zeolite at too high a rate of flow, some flushout water will be wasted.

Commercial requirements demand high rates of flow thru the zeolite and accordingly this invention provides a means of operation which meets the demands of commercial requirements and still provides for efficient operation in accordance with the capabilities of the zeolite.

Referring to Fig. 1, the container indicated by numeral 3, has within it the bed of water softening material 4, resting on gravel bed 5, both of which are supported by strainer plate 7.

In approximately the central portion of the zeolite bed, as shown, a distributor 12 provides an outlet within the container 3, for a fluid passing thereinto, thru pipe 13, towards both ends of the container.

The container 3, is provided at the top with a discharge outlet 21, leading to a drain or point of use thru piping 22, having valves 23 and 24 for purpose of directing the flow of a fluid passing from the container to use through pipe 25 or to a drain 26 respectively.

In this upper end of the container 3, a baffle plate 9 is equipped with strainer nozzles 10 which serve to assist in causing the water to pass uniformly thru the zeolite bed towards this plate. These strainer nozzles further serve to retain within the container 3 such zeolite as may be apt to pass from the container at the higher rates of flow.

Just below the baffle plate 9 and above the zeolite bed, there is provided a freeboard space 11 of sufficient depth for purpose of backwashing or loosening the bed of zeolite prior to the application of regenerating material. In operation, a fluid passing downwardly from the distributor 12 tends to pack this lower portion of the zeolite bed after a prolonged flow there thru with a resultant loss in operating efficiency and therefore it is desirable to have it in as loosened a condition as is practical.

In the lower end of the container 3, strainer or supporting plate 7 is equipped with suitably spaced strainer nozzles 6 which assist in directing the flow of fluids in a uniform manner thru the zeolite bed. Just below the strainer plate 7, a diffusing plate 15 serves to deaden the force of water entering container 3 thru the connection 19. At the bottom of the container 3, connection pipe 19 leads to the T fitting 16. One side of the fitting 16 has a connection leading to the drain or point of use thru valve 34 and piping 22, and the other side of the fitting 16 has a connection leading to the sources of raw water and regenerating material supply at 28 and 30 respectively.

Disposed in the piping 22 leading from both ends of the container 3, provision is made to control the flow of fluids from the distributor 12 thru the zeolite bed in a manner so that any desired division of flow from the distributor 12 to opposite ends of the container 3 may be had. Preferably half the volume entering thru the distributor should pass upwardly and the other half should pass downwardly. This provision consists of adjustable chokes 31 and 32 which can be set as desired for the purpose described above.

The choke 31 can be so set that it will restrict the flow of water to the drain during backwashing to a rate of flow desired for proper backwashing of the zeolite. With this choke 31 permanently set in this manner, choke 32 is then set to a position which will control the flow from the distributor 12 as heretofore described and thus secure any desired division of flow thru the zeolite bed principally in accordance with the relative openings of the chokes 31 and 32.

From a source of raw water supply at 28, controlled by valve 27, connection is made to the distributor 12 by the inlet pipe 13 as well as to the lower end of the container 3 at 19 thru the piping 38, valve 33 and fitting 16.

In a similar manner, from a brine tank or source of regenerating material supply at 30, (not shown) controlled by valve 29, connection is made to the distributor 12 by the inlet pipe 13 as well as to the lower end of the container 3 at 19 thru the piping 38, valves 33 and 35 and fitting 16.

The method of regeneration is as follows:—

The first operation consists in closing the valve 23 directing the flow to the point of use and leaving this valve closed during the entire period of regeneration.

The next operations to initiate the backwashing operation are the opening of valves 24 and 33 and closing of valves 34 and 35, valve 27 remaining open and valve 29 remaining closed as positioned during the softening period.

With the valves so positioned, the flow of backwashing water is from the source of raw water supply at 28, thru valve 27, piping 38, valve 33, fitting 16, connection 19, into container 3, passing diffusing plate 15, thence upwardly thru strainer nozzles 6, gravel bed 5, expanding the zeolite bed into the freeboard space 11, thence thru nozzles 10 leaving the container at 21, thence through choke 31, piping 22 and valve 24 to the drain at 26.

After a period of backwashing required to sufficiently loosen the bed of zeolite, usually determined by the judgment of the operator, valves 27 and 33 are closed and valves 29, 35 and 34 opened, the valve 24 remaining open as heretofore in the backwashing operation.

With the valves so positioned, a regenerating material from a suitable source of supply (not shown) flows thru piping 30, valve 29, thru piping 13, to the distributor 12 and thence by divided paths thru the zeolite, one path leading upwardly thru the upper part of the zeolite bed 4, freeboard space 11, strainer nozzles 10 leaving the container at 21, thence through choke 31, piping 22, to the drain at 26. The other path from the distributor 12 is downwardly thru the lower portion of the zeolite bed 4, gravel bed 5, strainer nozzles 6, thru connection 19 to fitting 16, valve 34, choke 32 and thru piping 22 to the drain at 26.

After a desired amount of regenerating material has passed into the container 3, the flow of regenerating material supply is shut off by the closing of valve 29, leading to the next operation of flushing the regenerating material from the zeolite.

Flushing out is accomplished by opening valve 27, permitting water from the source of supply at 28 to pass thru the same course as taken by the regenerating material until all brine has passed from the zeolite which is usually determined by a soap test.

After the brine is flushed from the zeolite bed, valve 24 is closed and valve 23 again opened to place the equipment into service for delivery of softened water to the point of use at 25, thus completing the entire cycle of regeneration.

During the period of softening, the flow of water is as during the flushing operation except that the flow is directed to a point of use by valve 23 instead of to a drain thru valve 24.

In the modified construction as shown in Fig. 2, the parts indicated by reference numerals 3, 4, 6, 7, 9, 10, 11, 15, 19, 21, 22, 23, 24, 25, 26, 27, 28, 29, 30, 35 and 38 carry the same description as in Fig. 1 and therefore it is hardly necessary to repeat.

Positioned approximately midway in the zeolite bed, as shown, is a collector 12a, fitted with zeolite retaining means, which provides an outlet from within the container 3 for a fluid passing therefrom thru pipe 13a and valve 34a to either a drain 26 or point of use at 25.

To avoid undue dilution of the regenerating material applied to the upper part of the zeolite bed 4, provision is made to apply the regenerating solution adjacent this upper zeolite top of the bed thru a distributor 36 in close proximity to the bed as shown.

As a means to force a downward direction of flow of the regenerating material to the zeolite bed, during the period of salting, a restricted flow of water from the source of supply at 28 passes thru piping 39, controlled by valve 41, into the container 3 thru the connection 40 causing a flow of water towards the distributor 36, so that no opportunity is afforded for the incoming regenerating solution to intermingle with the fresh water above the distributor 36.

It might be stated that the volume of water passing thru the piping 39 is of a negligible amount which does not materially affect other steps of the cycle of operation and therefore if desired the valve 41 can be left open at all times.

For reason that the flow of a fluid thru the lower part of the zeolite bed is always in an upward direction, the gravel bed 5, as in Fig. 1, may be dispensed with and a substitution of zeolite can be made in its place, so that more zeolite or water softening material can be placed in the container resulting in more capacity between regenerations when containers of the same size are compared.

Assuming that the softening material has become exhausted, the method of regeneration is as follows:—

The first operation consists in closing valve 23 and opening valve 24. The period of backwashing is then initiated by closing valves 34a and 35, valve 27 remaining open and valve 29 closed as positioned during the period of softening.

With the valves in this position, the flow of water is from the source of supply at 28, thru valve 27, piping 38, choke 31a, connection 19 into the container 3, passing plate 15, then upward thru nozzles 6, zeolite bed 4, freeboard space 11, thru nozzles 10 and thence from the container 3 thru connection 21, valve 33a, piping 22, valve 24 to a drain at 26.

Chokes 31a and 32a provide a means to control the proportional flow of a fluid to the softening material. Choke nozzle 31a is used to control the flow of a fluid passing thru the zeolite bed to the desired volume per minute for backwashing purposes and after being set to a fixed position for this purpose, choke 32a can be manipulated to a fixed position during other periods of the cycle of operation for purpose of securing a desired proportionate flow of fluids from the ends of the container 3 towards the collector 12a.

On completion of the backwashing operation, valves 33a and 27 are closed and valves 34a, 35, 29 and 41 are opened which will position the valves for the application of regenerating material. The flow of the regenerating material is from the source of supply (not shown) at 30, thru valve 29, thence taking divided paths, one path leading thru the choke 32a, piping 37 to distributor 36 passing downwardly thru the upper part of the zeolite bed 4 to the collector 12a, the other path leading thru valve 35, piping 38, choke 31a, connection 19, into container 3, thence upwardly thru strainer nozzles 6, the lower part of the zeolite bed 4, to collector 12a, whence the fluids from both paths flow from the container 3 thru collector 12a, piping 13a, valve 34a, piping 22, valve 24 to a drain at 26.

During the period of regeneration, a small volume of water passes from the source of raw water supply at 28, thru piping 39, valve 41 to the connection at 40, thence into container 3, downwardly thru strainer nozzles 10, freeboard space 11 to the distributor 36 where it intermingles with the fluid from the distributor 36 in passage to the drain.

After a sufficient charge of regenerating material has been introduced into the container 3, valve 29 is closed and valve 27 opened. This change in these two valve positions causes raw water to pass from the source of supply thru the same path as taken by the fluid during the period of regeneration, such flow being continued until the regenerating material has been completely flushed from the zeolite.

On completion of the flushout operation, valves 24 and 41 are closed and valve 23 opened, permitting the water to pass from the source of supply at 28 thru the paths taken during the periods of regeneration and flushing with exception of passage in the piping 39 and that the water will pass to the point of use 25 thru valve 23 instead of passing to the drain 26 thru valve 24.

In the foregoing, the description has been confined to an apparatus in which the fluid passes to or from approximately a central point in the zeolite bed and it is not the intent that such limitations shall be placed on this invention inasmuch as these constructions lend themselves to other means or methods of operation.

For illustration, it is quite practical to cause regeneration and flushing water to pass in divided paths thru the zeolite and then afterward direct water to be softened to the lower end of container 3 thru connection 19 for passage thru the zeolite bed 4, freeboard space 10, strainer nozzles 11, and thence out at 21 to the point of use at 25, thus passing the water thru the entire depth of bed when found desirable to do so for reason of certain operating conditions. Incidently, when the apparatus is operated as described in this paragraph, the operation of backwashing may be dispensed with due to the fact that upward softening keeps the zeolite bed in loosened form for efficient regeneration, provided that the rate of flow during softening is sufficiently high.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art will be able to take advantage of the principles involved in the disclosure by apparatus, use and methods of procedure perhaps dissimilar in appearance and arrangement but nevertheless within the scope of the invention and therefore desire to comprehend within my invention such modifications as may be necessary to adapt it to varying conditions and uses.

I claim:—

1. In a water softening system, the combination of a softener tank having an inlet connection and a plurality of outlet connections arranged so that flow from the inlet to the outlet connections will be in opposite directions, means for conducting regenerating material through the inlet connection to said tank, means for discharging said regenerating material through said outlet connections and means for proportioning the flow of regenerating material from the inlet connection to the outlet connections.

2. In a water softening system, the combination of a softener tank containing softening material with an inlet connection embedded in the softening material and a plurality of outlet connections, in spaced relation above and below said inlet connection means for alternatively conducting water and regenerating solution through the inlet connection to the softening material and means for discharging said fluids from the softener tank through said outlet connections alternatively to a service line and drain.

3. In a water softening system, the combination of a softener tank containing water softening material with an inlet connection embedded in the softening material at a point substantially one-half the depth of the bed of softening material and a plurality of outlet connections, means for successively conducting fluids through the inlet connection to the softening material and means for discharging said fluids from the softener tank thru said outlet connections.

4. In a water softening system, the combination of a softener tank containing softening material with an inlet connection embedded in the softening material at a point substantially one-half the depth of the bed of softening material and a plurality of normally open outlet connections, means for conducting a fluid through the inlet connection to the softening material, means for discharging said fluid from the softener tank through said outlet connections and means for proportioning the flow of said fluid from the inlet connection to the outlet connections.

5. In a water softening system, the combination of a softener tank containing water softener material with a means for conducting fluids to the softening material and a means for conducting fluids from the softening material and means for causing the fluids flowing to the softening material to take divided paths through the softening material in a predetermined proportion, the respective paths of flow being confined to respective zones of the water softening material divided transversely of the direction of flow therethrough.

6. A water softener comprising a container for a bed of water-softening material having a hard water supply pipe and a soft water delivery pipe in connection therewith, at least one of said pipes having a plurality of connections with said container, and the connections of the respective pipes with the softener being arranged for dividing the flow of water through the bed so that different parts of the flow are confined to different water-softening zones thereof divided transversely of the direction of flow therethrough, the flow from the said hard water supply pipe through the container to the said soft water supply pipe being through the connections mentioned.

7. A water softener comprising a container for a bed of water-softening material, valve-controlled supply piping for water and regenerating solution, and valve-controlled delivery piping for delivering soft water to service or waste liquid to a drain, said container having inlet and outlet connections adapted to be connected with the supply and delivery piping, at least one of said connections comprising a plurality of passages so related to the other of said connections that the respective liquids flowing through the container in the several operations of the softener flow in separate streams through different zones of the bed divided transversely of the direction of flow therethrough, said valve controlled supply and delivery piping being adapted to be so controlled that alternatively a flow of regenerating solution and a flow of water is established through one of said zones while a flow of water is established through the other of said zones.

8. A water softener having, in combination with a bed of water-softening material, means for introducing hard water into the bed between upper and lower parts thereof, a soft water delivery pipe, and outlet means above and below the point of introduction of the water and through which the water flowing oppositely from said point discharges to the soft water pipe.

9. A water softener having, in combination with a bed of water-softening material, a plurality of vertically spaced connections near opposite ends of the bed for introducing liquid thereto, a delivery pipe, and outlet means within the bed of water-softening material intermediate the points of introduction of the liquid through which the liquid flowing oppositely from said points discharges to said delivery pipe.

10. A water softener having, in combination with a bed of water-softening material, means for introducing regenerating solution thereto at vertically spaced points and means for withdrawing the solution from an intermediately positioned point.

ANDREW J. DOTTERWEICH.